(12) United States Patent
Watarai et al.

(10) Patent No.: US 6,809,773 B1
(45) Date of Patent: Oct. 26, 2004

(54) CAMERA

(75) Inventors: Kazuhiko Watarai, Tama (JP); Koh Yokokawa, Akishima (JP); Kaoru Kaneko, Kunitachi (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/417,188

(22) Filed: Oct. 12, 1999

(30) Foreign Application Priority Data

Oct. 15, 1998 (JP) .......................................... 10-293645

(51) Int. Cl.[7] ........................ H04N 5/232; H04N 5/225; G03B 3/00; G03B 17/00
(52) U.S. Cl. ................. 348/345; 348/373; 348/211.99; 396/89; 396/56
(58) Field of Search .............................. 348/335, 345, 348/348, 360, 373–376, 340; 396/56, 89, 529, 75; 250/201

(56) References Cited

U.S. PATENT DOCUMENTS

| | | | | |
|---|---|---|---|---|
| 4,404,595 A | * | 9/1983 | Ushiro et al. | 348/348 |
| 4,486,074 A | * | 12/1984 | Sato | 396/89 |
| 4,508,443 A | * | 4/1985 | Matsuzaki et al. | 396/103 |
| 4,627,699 A | * | 12/1986 | Takagi | 396/89 |
| 4,928,179 A | * | 5/1990 | Takahashi et al. | 348/211.2 |
| 5,014,080 A | * | 5/1991 | Miyadera | 396/59 |
| 5,450,156 A | * | 9/1995 | Kawasaki et al. | 396/75 |

FOREIGN PATENT DOCUMENTS

| | | | | |
|---|---|---|---|---|
| JP | 02-085837 A | * | 3/1990 | ........... G03B/17/38 |
| JP | 11-17987 | | 1/1999 | |

* cited by examiner

*Primary Examiner*—Andrew Christensen
*Assistant Examiner*—Nhan Tran
(74) *Attorney, Agent, or Firm*—Frishauf, Holtz, Goodman & Chick, P.C.

(57) ABSTRACT

An electronic camera includes a camera main body and a lens barrel arranged on the front face of the camera main body to extend forward therefrom, and to hold an image-pickup lens therein. A U-shaped protruding cover is attached to the lens barrel to extend downward therefrom. The bottoms of the camera main body and the protruding cover are level with each other. First and second windows are arranged on the front face of the protruding cover. A lamp for emitting an auto-focus assist light is arranged in the protruding cover to face the first window. A sensor for receiving a light signal from a remote control is arranged in the protruding cover to face the second window.

12 Claims, 3 Drawing Sheets

CAMERA

BACKGROUND OF THE INVENTION

The present invention relates a camera provided with a lens barrel protruding from a camera main body.

In recent years, lens barrels are becoming larger, along with the development of the performance of lenses. Consequently, where a camera has a lens barrel protruding from a camera main body, the center of gravity of the camera shifts toward the lens barrel, thereby sometimes making the camera unstable when it is placed on a table.

Further, where the camera main body is provided with a light-emitting element for an auto-focus assist light and a light-receiving element for a remote control, the light is partly blocked by the protruding lens barrel. As a result, problems arise in that the effective scope of the auto-focus mechanism is narrowed, and the light receiving scope for the remote control is also narrowed.

Jpn. Pat. Appln. KOKAI Publication No. 11-17987 discloses a camera having a lens barrel protruding from a camera main body. U.S. patent application Ser. No. 09/050,339 filed on Mar. 30, 1998 discloses a camera having a lens barrel protruding from a camera main body and supported by a mount frame. The structure shown in patent application Ser. No. 09/050,339 can solve an unstable state of a placed camera, which may be caused in the structure shown in KOKAI Publication No. 11-17987, nevertheless it still entails problems about the operability of the camera, and the effective scopes of light-emitting and light-receiving elements.

BRIEF SUMMARY OF THE INVENTION

Accordingly, an object of the present invention is to provide a camera in which the effective scopes of light-emitting and light-receiving elements are not limited, so that associated mechanisms can normally operate even if the camera has a large lens barrel.

Another object of the present invention is to provide a camera which is stably held and/or easily handled while it is placed or used for picture taking, even if the camera has a large and heavy lens barrel.

According to a first aspect of the present invention, there is provided a camera comprising:

a camera main body;

a lens barrel arranged on a front face of the camera main body to extend forward therefrom, and to hold an image-pickup lens therein;

a protruding section arranged on the lens barrel to extend downward therefrom, and to have a bottom at a level substantially not beyond a bottom of the camera main body; and a light-emitting portion or a light-receiving portion arranged on a front face of the protruding section.

According to a second aspect of the present invention, there is provided a camera comprising:

a camera main body;

a lens barrel arranged on a front face of the camera main body to extend forward therefrom, and to hold an image-pickup lens therein; and a protruding section arranged on the lens barrel to extend downward therefrom, wherein the camera main body and the protruding section have bottoms substantially level with each other, wherein the protruding section has a width defined by first and second side surfaces which extend along an optical axis of the image-pickup lens and face each other, and the width gradually decreases from the lens barrel to the bottom of the protruding section, and wherein the first side surface has a steeper angle from the lens barrel to the bottom of the protruding section than that of the second side surface.

According to a third aspect of the present invention, there is provided a camera comprising:

a camera main body having a bottom for mounting the camera on a support body;

a lens barrel arranged on a front face of the camera main body to extend forward therefrom, and to hold an image-pickup lens therein, the lens barrel having a bottom at a level higher than the bottom of the camera main body;

a protruding cover attached to the lens barrel to extend downward therefrom, and to have a bottom at a level substantially not beyond the bottom of the camera main body;

a first window arranged on a front face of the protruding cover; and a light-emitting element arranged in the protruding cover to face the first window, for emitting light to be radiated through the first window to a position outside the protruding cover.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figures 1A, 1B:
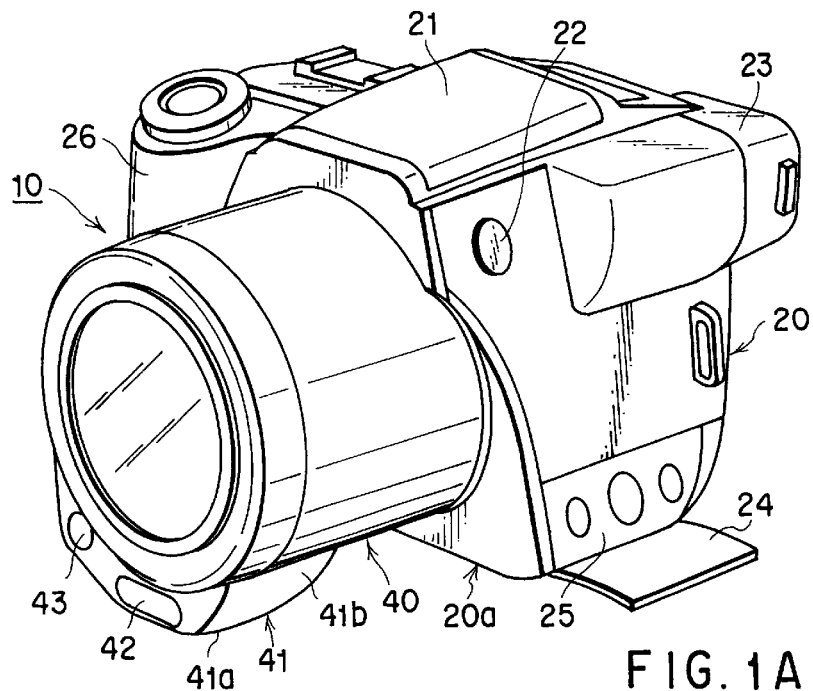
FIGS. 1A and 1B are perspective views showing, from different angles, an electronic camera according to a first embodiment of the present invention.

Embodiments of the present invention will be described hereinafter with reference to the accompanying drawings. In the following description, the constituent elements having substantially the same function and arrangement are denoted by the same reference numerals, and a repetitive description will be made only when necessary.

Figure 2:
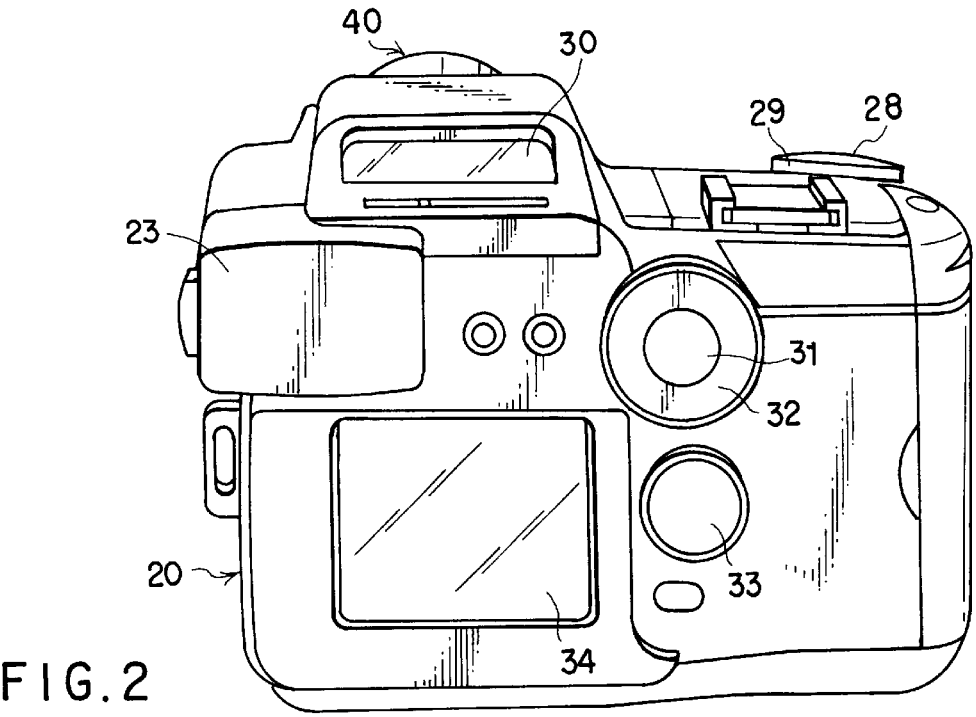
FIG. 2 is a rear view of the electronic camera.

As is shown in FIGS. 1A through 2, an electronic camera 10 according to a first embodiment of the present invention comprises a camera main body 20 and a lens barrel 40 attached to the camera main body 20.

The front, lateral and top sides of the electronic camera 10, as shown in FIGS. 1A and 1B, are provided with a pop-up strobe 21 having a light-emitting portion arranged therein, a pop-up button 22, an optical finder 23 for observing a target object during picture taking, an input/output terminal cover 24, an input/output terminal section 25, a grip section 26, a card cover 27, a release switch 28 of a two-step type for starting image-pickup, and a zoom switch 29. The grip section 26 is used for gripping the electronic camera 10 by a right hand during picture taking. The card cover 27 is used for opening and closing first and second card slots 69a and 69b (see FIG. 3) into which memory cards M1 and M2 are inserted, respectively.

As is shown in FIG. 2, the rear side of the electronic camera 10 is provided with a mode display LCD 30, a power switch 31, a mode dial 32, a cursor key 33, and an image display LCD 34. The mode dial 32 is used for switching within a recording mode, and switching between the recording mode and a reproducing mode. The mode display LCD 20 is used for displaying a photographing mode, recorded numbers, and the like. The image display LCD 34 is used as an image-pickup finder in the photographing mode, and as a reproducing monitor for recorded photograph images in the reproducing mode.

As shown in FIGS. 1A and 1B, a protruding section formed of a cover or casing prepared independently of the lens barrel 40, i.e., a protruding cover 41, is attached to the lower side of the lens barrel 40. The camera main body 20 and the protruding cover 41 respectively have bottoms 20a and 41a which are level with each other. The front side of the protruding cover 41 is provided with first and second windows 42 and 43. A lamp 59 for emitting an auto-focus assist light and a light-receiving sensor 60 for receiving a light signal from a remote control are arranged in the protruding cover 41 to face the windows 42 and 43, respectively. Details about the protruding cover 41 will be explained later.

Figure 3:
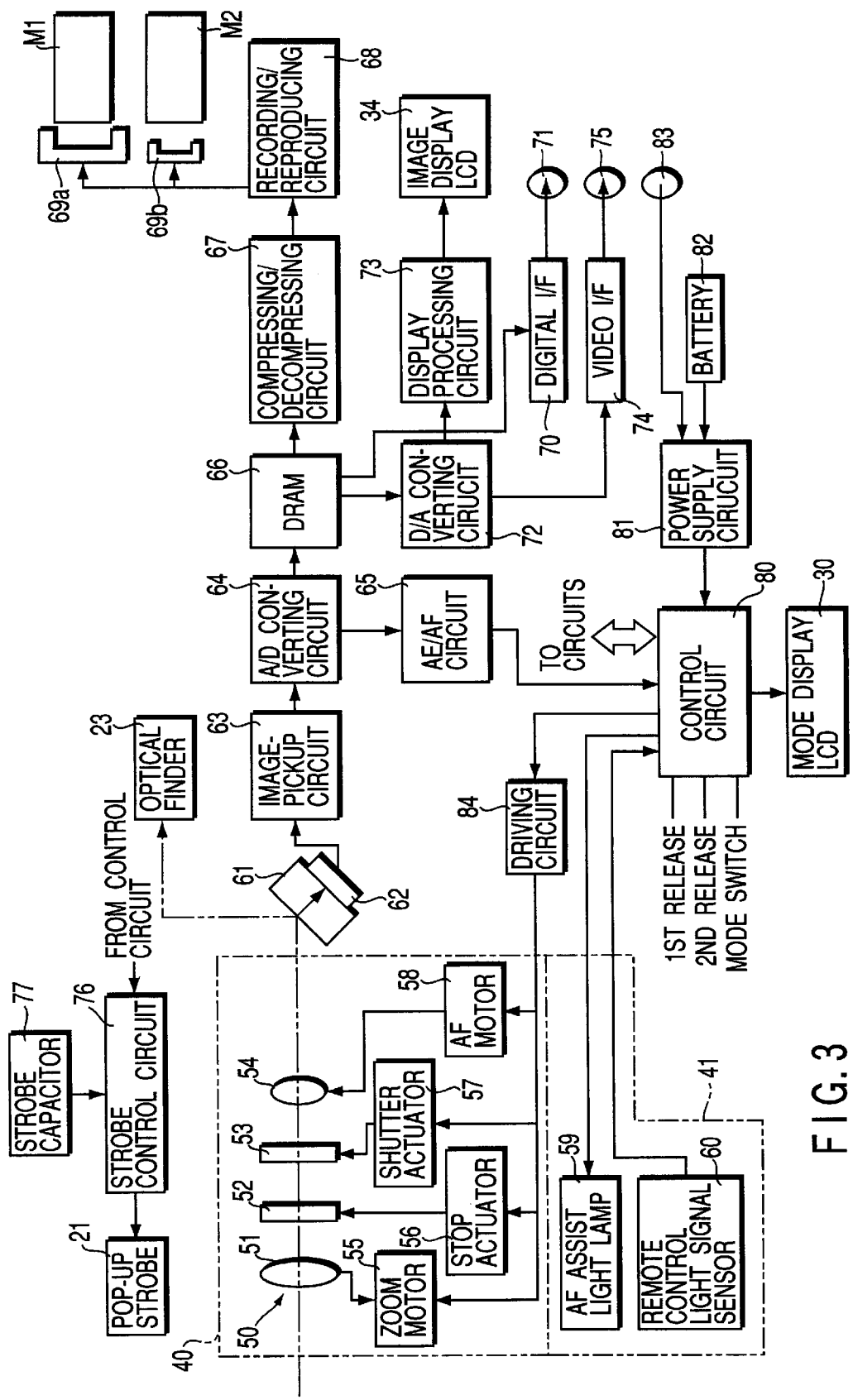
FIG. 3 is a block diagram showing the arrangement of the entire components, and mainly the inner circuit, of the electronic camera.

FIG. 3 is a block diagram showing the arrangement of the entire components, and mainly the inner circuit, of the electronic camera 10.

In the lens barrel 40, there is an image-pickup lens unit 50. The image-pickup lens unit 50 includes a zoom lens 51, a stop 52, a shutter 53, and focus lens 54, which are driven by a zoom motor 55, a stop actuator 56, a shutter actuator 57, and an AF (auto-focus) motor 58, respectively, under the control of a driving circuit 84. In the protruding cover 41, there is the AF assist light lamp 59 for the auto-focus mechanism, and the sensor 60 for receiving a light signal from a remote control.

On the other hand, at the entrance of the camera main body 20, there is a prism 61 for splitting incident rays of a target object image from the image-pickup lens unit 50 into two parts towards the optical finder 23 and an image-pickup element 62, respectively. The image-pickup element 62 photoelectrically converts an incident beam of the target object image focused on its image-pickup surface into an electric signal output. The signal from the image-pickup element 62 is inputted into an A/D (analog/digital) converting circuit 64 though an image-pickup circuit 63 for processing signals. The signal from the A/D converting circuit 64 is inputted into a control circuit 80 through an AE/AF (auto-exposure/auto-focus) circuit 65, and also inputted into a DRAM 66.

An image data stored in the DRAM 66 is drawn and compressed by a compressing/decompressing circuit 67, and is recorded in a memory card M1 in a first card slot 69a or a memory card M2 in a second card slot 69b by a recording/reproducing circuit 68. The image data inputted in the recording/reproducing circuit 68 is converted, under the control of the control circuit 80, into a signal which can be recorded in the memory cards M1 and M2.

The DRAM 66 is also connected to a digital output terminal 71 through a D/A (digital/analog) converting circuit 72 and a digital I/F (interface) 70. Further, the DRAM 66 is connected to the image display LCD 34 through the D/A (digital/analog) converting circuit 72 and a display processing circuit 73. Furthermore, the DRAM 66 is connected to a video output terminal 75 through a video I/F 74.

The pop-up strobe 21 emits light under the control of a strobe control circuit 76. A strobe capacitor 77 is connected to the strobe control circuit 76.

The control circuit 80 controls the driving circuit 84, the AF assist light lamp 59, the strobe control circuit 76, the image-pickup circuit 63, the A/D converting circuit 64, the DRAM 66, the compressing/decompressing circuit 67, the recording/ reproducing circuit 68, the D/A converting circuit 72, the display processing circuit 73, etc. A battery 82 and an outer power supply terminal 83 are connected to the control circuit 80 through a power supply circuit 81.

A brief explanation will be given of an image-pickup operation, using the electronic camera 10.

First, the power supply switch 31 is turned on by a user, and the control circuit 80 is supplied with electric power from an outer power supply or the battery 82 through the power supply circuit 81. With this turn-on function, the electronic camera 10 starts operating, and performs various initializations and confirmations. The control circuit 80 detects the presence/absence of the memory cards M1 and M2, on the basis of signals from mechanical means, such as a leaf switch, or means for electrically detecting the attached state of, e.g., a connector, which is arranged in each of the card slots 69a and 69b. When the camera is used, at least one of the memory cards M1 and M2 is inserted in the corresponding one of the card slots 69a and 69b. Then, units of information about the whole memory capacity and the used memory capacity in the inserted memory cards M1 and M2 are read out of the memory cards, and stored in the control circuit 80.

During picture taking, the recording mode is selected by the user through the mode switch 32. Then, a specific mode is designated out of modes within the recording mode by the user through the mode switch 32. As the modes within the recording mode, there is prepared an ordinary photographing mode where an image is recorded in accordance with one push on the release switch 28, a serial photographing mode where images are picked up in series, and so forth. The memory cards M1 and M2 are checked by the control circuit 80 as to whether they are available for recording, and then this condition, recordable number, etc. of the cards are displayed. Since these units of information, such as the type of a card presently used and the recordable number, are displayed by the mode display LCD 30, erroneous operations are prevented.

In the ordinary photographing mode, an picked-up image is confirmed through the optical finder 23, and the release switch 28 is pushed down by the user, so that the picked-up image is recorded into a selected memory card. At this time, when the release switch 28 is pushed down to the first step, the first release is turned on, and circuits are controlled by the control circuit 80 to prepare for adjustment of the stop, auto-focus, emitting of strobe light, and the like. Further, when the release switch 28 is pushed down to the second step, the second release is turned on, and the memory cards M1 and M2 are subjected to the recording operation.

On the other hand, the reproducing mode is selected by the user through the mode switch 32 when a reproducing operation is performed. A reproduced image data is displayed on the image display LCD 34, and, if necessary, the data is output to an outside machine, such as a printer, connected to the input/output terminal section 25 by a connector.

An explanation will given in the detail of the protruding cover 41.

As shown in FIGS. 1A and 1B, the camera main body 20 has a bottom 20a which provides an essentially flat surface for placing the camera on a support body, such as a table. On the other hand, the cylindrical lens barrel 40 arranged to extend from the front face of the camera main body 20 has a bottom which is positioned at a height level above the bottom 20a of the camera main body 20. Utilizing the difference in the height levels of the bottoms, the protruding cover 41 is attached near the distal end of the lens barrel 40 and extends downward from the lens barrel 40. The protruding cover 41 has a bottom 41a at a level substantially not beyond the bottom 20a of the camera main body 20, and, particularly in this embodiment, at a height level substantially aligned with the bottom 20a.

Consequently, when the electronic camera 10 is placed on a flat support body, such as a table, its weight (mainly the total weight of the camera main body 20 and the lens barrel 40) is loaded onto the support body through the bottom 20a of the camera main body 20 and the bottom 41a of the protruding cover 41. The bottoms 20a and 41a are located to include or interpose the center of gravity of the electronic camera 10, so that the electronic camera 10 is not carelessly caused to fall down. Even where the lens barrel 40 is big and heavy, no unstableness is caused on the electronic camera 10, because the bottoms 20a and 41a support the entirety of the camera 10 on the support body.

The protruding cover 41 is attached to the lower side of the lens barrel 40 near its distal end, such that it makes a substantially U-shape. Specifically, the width defined by the opposite side surfaces 41b and 41c of the protruding cover 41, which extend along the central axis of the cylindrical lens barrel 40, i.e., the optical axis of the image-pickup lens unit 50, gradually decreases from the lens barrel 40 to the bottom 41a of the protruding cover 41. The first side surface 41b on the side opposite to the grip section 26 intersects with the lens barrel 40 at a lower position, and has a steeper angle from the lens barrel 40 to the bottom 41a of the protruding cover 41, as compared to the second side surface 41c.

In other words, the protruding cover 41 has a shape such that a user can easily operate the electronic camera 10 while putting the left hand on the cover 41 during picture taking. The first and second side surfaces 41b and 41c forming the specific U-shape of the protruding cover 41 have been shaped in light of the angle formed by the thumb and the index finger of the user's left hand at this time. Consequently, during picture taking, the user can stably hold and operate the electronic camera 10 while holding the grip section 26 by the right hand and the protruding cover 41 by the left hand. Alternatively, since there is a gap between the camera main body 20 and the protruding cover 41, the user may put the left hand on the lens barrel 40 at a position corresponding to this gap.

Further, the protruding cover 41 is arranged near the distal end of the lens barrel 40, and its front face with windows 42 and 43 is located near the front face of the lens barrel 40. The lamp 59 for emitting an auto-focus assist light and the sensor 60 for receiving a light signal from a remote control are arranged in the protruding cover 41 to face the windows 42 and 43, respectively. Consequently, the light from the window 42 and the light to the window 42 are not blocked off by the lens barrel 40, thereby allowing the auto-focus mechanism and the remote control mechanism to normally operate. Further, the lamp 59 and the sensor 60 need not be arranged in the camera main body 20, thereby allowing the camera main body 20 to be compact while effectively utilizing the space inside the protruding cover 41.

Figure 4:
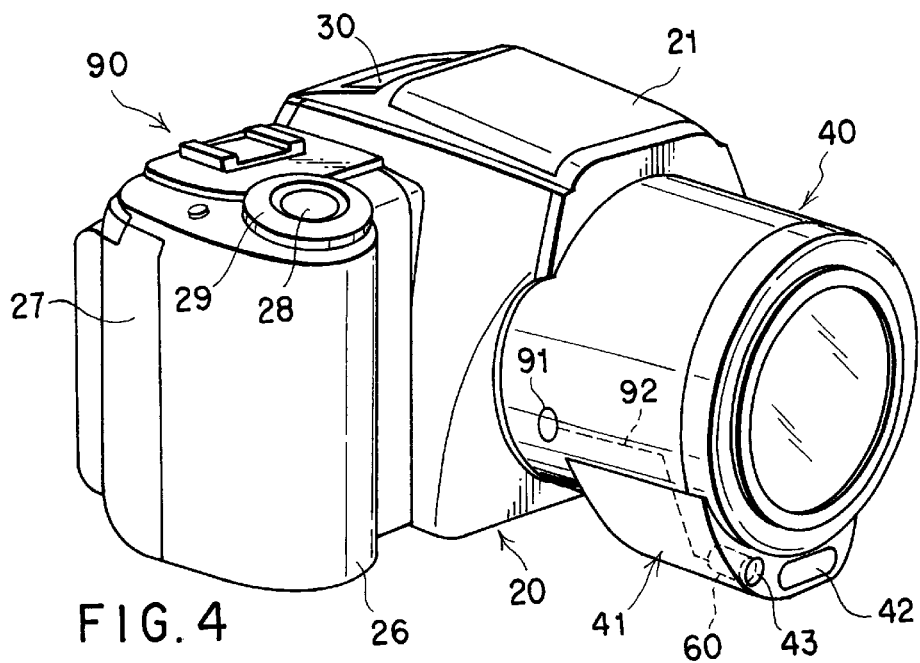
FIG. 4 is a perspective view showing an electronic camera according to a second embodiment of the present invention.

FIG. 4 is a perspective view showing an electronic camera 90 according to a second embodiment of the present invention.

The electronic camera 90 differs from the electronic camera 10 according to the first embodiment in that the camera 90 has a lens barrel 40 provided with a window 91, and a light guide 92 is arranged between the window 91 and a light-receiving element (the sensor for a remote control) 60. A light signal from a remote control can be received through the window 91 as well as through the window 43, thereby expanding the light-receiving scope.

In the above described embodiments, although the lens barrel 40 is fixed to the camera main body 20, the lens barrel 40 may be detachably mounted onto the camera main body 20. Further, in the above described embodiments, although an electronic camera is explained, the present invention may be similarly applied to a camera using a silver film.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic camera comprising:
   a camera main body having a front face and a bottom portion;
   a lens barrel arranged on the front face of said camera main body and extending forward therefrom, the lens barrel containing an image-pickup lens therein and including a front face;
   a protruding section arranged or; said lens barrel and extending downward therefrom, the protruding section having a bottom portion in substantially the same plane as the bottom portion of said camera main body, said protruding section being disposed near a distal end of said lens barrel such that a gap is defined between said camera main body and said protruding section and below said lens barrel for a user to put a hand for manipulation of said electronic camera, said protruding section having a front face located proximate to the front face of said lens barrel; and
   a light-emitting portion arranged on the front face of said protruding section and disposed below said lens barrel, said light-emitting portion being configured to emit an auto-focus assist light.

2. The electronic camera according to claim 1, wherein said protruding section comprises a protruding cover attached to said lens barrel.

3. The electronic camera according to claim 1, wherein said protruding section includes first and second side surfaces which define a width, the first and second side surfaces extend along an optical axis of said image-pickup lens and face each other, and said width gradually decreasing along the length of said protruding section from a point proximate said lens barrel to said bottom portion of said protruding section.

4. The electronic camera according to claim 3, wherein said first side surface has an angle extending from said lens barrel to said bottom portion of said protruding section which is greater than angle of said second side surface extending from said lens barrel to said bottom portion of said protruding section.

5. The electronic camera according to claim 4, wherein said first side surface intersects with said lens barrel at a lower position than that at which said second side surface intersects with said lens barrel.

6. The electronic camera according to claim 1, further comprising a first light-receiving portion arranged on the front face of said protruding section, said light-receiving portion receiving light signal from a remote control for controlling said camera.

7. The electronic camera according to claim 6, further comprising a second light-receiving portion arranged on a side surface of said lens barrel, said second light-receiving portion receiving a light signal from the remote control for controlling said camera.

8. The electronic camera comprising:
   a camera main body having a front face and a bottom portion;
   a lens barrel arranged on the front face of said camera main body and extending forward therefrom, the lens barrel containing an image-pickup lens therein and including a front face;
   a protruding section arranged on said lens barrel and extending downward therefrom, the protruding section having a bottom portion in substantially the same plane as the bottom portion of said camera main body, said protruding section being disposed near a distal end of said lens barrel such that a gap is defined between said camera main body and said protruding section and below said lens barrel for a user put a hand for manipulation of said electronic camera, said protruding section having a front face located proximate to the front face of said lens barrel; and
   a light-emitting portion arranged on the front face of said protruding section and disposed below said lens barrel, said light-emitting portion being configured to emit an auto-focus assist light,
   wherein said protruding section includes first and second side surfaces which define a width, the first and second side surfaces extend along an optical axis of said image-pickup lens and face each other, and said width gradually decreasing along the length of said protruding section from a point proximate said lens barrel to said bottom portion of said protruding section, and
   wherein said first side surface has an angle extending from said lens barrel to said bottom portion of said protruding section which is greater than an angle of said second side surface extending from said lens barrel to said bottom portion of said protruding section.

9. The electronic camera according to claim 8, wherein said protruding section comprises a protruding cover attached to said lens barrel.

10. The electronic camera according to claim 8, wherein said firs;t said surface intersects with said lens barrel at a lower position than that at which said second side surface intersects with said lens barrel.

11. The electronic camera according to claim 8, further comprising a first light-receiving portion arranged on the front face of said protruding section: said light-receiving portion receiving a light signal from a remote control for controlling said camera.

12. The electronic camera according to claim 11, further comprising a second light-receiving portion arranged on a side surface of said lens barrel, said second light-receiving portion receiving a light signal from the remote control for controlling said camera.

* * * * *